United States Patent Office 3,184,490
Patented May 18, 1965

3,184,490
ORGANIC ALUMINIUM COMPOUNDS
Brian K. Davison, Didsbury, Manchester, England, assignor to Hardman & Holden Limited, Manchester, England, a British company
No Drawing. Filed Apr. 28, 1961, Ser. No. 106,183
Claims priority, application Great Britain, May 2, 1960, 15,302/60
2 Claims. (Cl. 260—414)

This is a continuation-in-part of application Serial No. 49,137, filed August 12, 1960.

This invention relates to organic aluminium compounds and has for its object to provide organic aluminium compounds having rates of hydrolysis in acid solution, in water or in alkaline solution which are limited so as not to exceed desired values, and in particular to provide compounds of this type which are suitable for use for pharmaceutical purposes. This invention further relates to methods of preparing such compounds.

It is known that many aluminium compounds upon treatment with acid, alkali or water rapidly release the grouping which is attached to the aluminium. In many cases rapid release is desirable, but in others it is not so. For example, in the administration of drugs, rapid release is desirable when an immediate effect is required, but when sustained activity is needed, a compound is required which ideally liberates its active principle at the same rate at which the body deactivates it, thereby maintaining a steady level throughout a period of time.

According to the invention, pharmaceutical preparations in the form of organic aluminium compounds are obtained by reacting aluminium alkoxides with water and, at least one pharmacologically active substance containing a group with a reactive hydrogen atom and with at least one substance yielding a group chosen to dominate the reactivity of the resultant compound with respect to hydrolytic agents, until a polymeric reaction product is obtained.

Substances which yield groups for controlling the rate of hydrolysis include substances which are fatty or waxy in nature, for example oleic acid, stearic acid, oleyl alcohol, stearyl alcohol, cetostearyl alcohol and castor oil, which impart some of their waxy or fatty characteristics to the molecule so that the hydrolysis is slowed down considerably or prevented dependent upon the amount of these materials present. Controlled hydrolysis may also be achieved by the attachment of groups, such as the benzoate group, which impart limited solubility in water to the resultant aluminium compound. Aluminium compounds which have any desired rate of hydrolysis, within limits, may be obtained by suitable choice of the hydrolysis limiting group and by the relative proportion of the groups in the molecule.

To be suitable for use in this process the pharmacologically active substances must contain at least one active hydrogen atom, that is, they must contain an hydroxyl, carboxyl, acid amide, imide, sulphonic acid, phenolic or ketoenolic group.

Examples of such substances are: tribromoethanol, trichloro-tert-butanol, methyl pentynol, chloral hydrate, benzyl alcohol, 3-(2-methyl phenoxy)-propane-1.2-diol, glycerol, ethanolamine, salicylic acid and its esters, acetyl salicylic acid, p-amino salicylic acid, barbituric acid and its substitution products, saccharin, ascorbic acid, gluconic acid, glucose, sorbitol, sucrose, maltose, raffinose, lactose and other oligosaccharides, androgens, oestrogens, progesterones, corticosteroids, ephedrine, adrenaline and sympathomimetic substances of the adrenaline type, penicillin, aureomycin, chloramphenicol, tetracycline hydrochloride, oxytetracycline hydrochloride, erythromycin, atropine and its analogues, thymol, hexyl resorcinol, phenolphthalein, aloe-emodin, stilboestrol, bis-hydroxy coumarin, mandelic acid, benzoic acid, lactic acid, chaulmoogric acid, nicotinic acid, nicotinamide, phenacetin, acetanilide, and other substance of the constitution referred to which are described in the British Pharmaceutical Codex 1959.

The compounds are believed to be of the formula

where $p=0$ or a whole number and each X may be a hydroxyl group, a residue of a pharmacologically active substance or a residue of a hydrolysis rate controlling substance or a combination of these, the compound containing both hydrolysis rate controlling residues, and pharmacologically active residues groups in appropriate proportions.

The preferred state is when $p=1$, giving a formulation of

The preferred aluminium alkoxides which may be used in this process are those which are soluble in organic solvents and include such alcoholates as those derived from isopropyl, n-propyl, n-butyl, sec-butyl and tertiary butyl alcohols. The alcohol may be straight or branched chain, saturated or unsaturated, substituted or unsubstituted. The alkoxides of isopropyl alcohol and sec-butyl alcohol are preferred for most purposes, but others can be used with good results, for example the alkoxide derived from the monoethyl ether of ethylene. A single alkoxide or a mixture of alkoxides may be used.

In carrying out this reaction the amount of water added is critical. It is known that if water is added to an aluminium alkoxide, the alcohol forming the alkoxide is liberated and an equivalent amount of a hydroxyl compound is formed. For instance, if three moles or more of water are added to one mole of aluminium isopropoxide, one mole of aluminium hydroxide is formed and three moles of isopropanol are liberated.

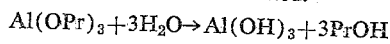

Likewise, if one mole or more of water is added to aluminium diacylate monoalkoxide a basic aluminium salt is formed:

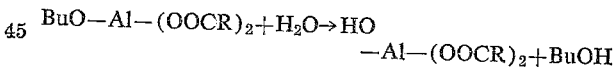

The basic aluminium salts are the normal product when aluminium salts are prepared in aqueous systems, for example the normal aluminium soaps of fatty acids which are prepared from aluminium sulphate by a metathetic process.

However to form compounds of the empirical formula

it is essential that only ⅔ of a mole of water is reacted per mole of aluminium alkoxide used (i.e., two moles of water per three moles of aluminium alkoxide). On heating the resultant reaction product to a temperature above the boiling point of the alcohol which formed the alkoxide, the liberated alcohol is distilled off and it is found that 4/3 of a mole of the alcohol are liberated (i.e., 4 moles of alcohol per three moles of aluminium alkoxide). It should be noted that this amount of water, ⅔ of a mole of water per mole of aluminium alkoxide, is the amount of water needed to bring about the aluminium to oxygen polymerisation only and if it is required to have the grouping X as a hydroxyl group, extra water in the ratio of one mole to 1 mole of X has to be added.

When it is desired to have values of $p$ greater than 1 proportionately larger amounts of water are used to bring about the aluminium to oxygen condensation. The maximum allowable amount of water which can be added to effect condensation of the aluminium alkoxide is one mole of water per mole of aluminium alkoxide and the lower limit, that is when $p=0$, is 0.5 mole of water per mole of aluminium alkoxide.

It should be understood that these limits to the quantities of water added are correct only insofar as the exact stoichiometric proportions pertain. Practical considerations, such as, for example, retention of some of the water by the solvent will necessitate a divergence from these limits.

Reaction can be brought about by adding a solution of the pharmacologically active substance together with the rate controlling substance in a solvent to the aluminium alkoxide after the aluminium alkoxide has been caused to react with water, or by adding the pharmacologically active substance and water in a solvent to the aluminium alkoxide which has been caused to react with the rate controlling substance, except when the substance which exercises control of the degree of hydrolysis of the resulting product does so by imparting limited solubility, or by adding the pharmacologically active substance in a solvent to the aluminium alkoxide which has been caused to react with water and the rate controlling substance, except when the substance which gives control of the degree of hydrolysis of the resulting product does so by imparting limited solubility. Alternatively the rate controlling substance in a solvent, the pharmacologically active substance in a solvent and the water in a solvent may be added separately but simultaneously to the aluminium alkoxide in a solvent, or the pharmacologically active substance, the rate controlling substance and the water may be mixed together in a solvent and the resultant solution of the mixture run into the aluminium alkoxide in a solvent.

It is advantageous in all these methods to stir the reaction mixture although it is not absolutely necessary. The resultant aluminium compound when soluble is obtained by removal of the liberated alcohol and solvents by distillation under reduced pressure to enable the solvent or solvents to be removed at as low a temperature as possible. When the resultant aluminium compound is insoluble in the solvent system used it is possible to recover the aluminium compound by filtration from the solvent mother liquors.

To illustrate the results obtainable according to the invention, the following figures shown in Table 1 have been obtained for the hydrolysis of an aluminium p-aminosalicylate of formula $Al_3O_2X_5$ and for aluminium p-amino-salicylate-oleate of formula $Al_3O_2X_5$ where X=p-aminosalicylic acid and oleic acid in different molar ratios at 37° C.

TABLE 1

| Compound | Time for 100% hydrolysis | |
|---|---|---|
| | Acid strength N/500 | Acid strength N/100 |
| An aluminium p-amino salicylate (no oleic acid). | 1 minute | Immediately. |
| An aluminium p-amino salicylate-oleate, ratio of salicylate to oleate = 19. | 5 minutes | 1 minute. |
| An aluminium p-amino salicylate-oleate, ratio of salicylate to oleate = 9. | 15 minutes | 5 minutes. |
| An aluminium p-amino salicylate-oleate, ratio of salicylate to oleate = 4. | 54% hydrolysis after 120 mins. | 60 minutes. |
| An aluminium p-amino salicylate-oleate, ratio of salicylate to oleate = 2.33. | 10% hydrolysis after 120 mins. | 63% hydrolysis after 120 mins. |

The following figures shown in Table II have been obtained for the hydrolysis of products of the empirical formula $Al_3O_2X_5$, where X represents an ascorbic acid residue or ascorbic acid and benzoic acid residues present in the ratios stated, at 37° C. in 0.01 N hydrochloric acid. The products are mixtures having an average analysis as stated.

TABLE II

| | Compound, percent hydrolysis | | |
|---|---|---|---|
| Time in mins. | An aluminium Vit. C. compound (no benzoate) | Aluminium Vit. C-benzoate (Vit. C-benzoate ratio = 2) | Aluminium Vit. C-benzoate (Vit. C-benzoate ratio = 0.5) |
| 0 | | | |
| 5 | 100 | 16 | 15 |
| 15 | 100 | 39 | 20 |
| 30 | 100 | 49 | 26 |
| 60 | 100 | 52 | 32 |
| 220 | 100 | 63 | 40 |

With a buffer solution of pH 7 and one of pH 8, a mixture of aluminium p-aminosalicylate-stearate of the formula $Al_3O_2X_5$ in which X represents p-aminosalicylic acid and stearic acid residues and in which the p-aminosalicylate and the stearate are present in equimolecular proportions is only hydrolysed to 2 to 5%, after two hours. When there is no stearate present the aluminium p-aminosalicylate is rapidly hydrolyzed i.e. 90 to 100% in 5 to 10 minutes.

The preparation of the organic aluminium compounds according to the invention is illustrated by the following examples.

*Example 1.—An aluminium polyoxo p-aminosalicylate-oleate (4:1 ratio)*

Aluminium isopropoxide (61.2 gm.) is dissolved in isopropyl alcohol (500 ml.) in a 5-litre flask by warming on a water bath. Oleic acid (27.6 gm.) p-aminosalicylic acid (61.2 gm.) and water (3.6 gm.) are dissolved together in isopropyl alcohol (1,500 ml.) again by warming on a water bath and this warmed solution run into the aluminium isopropoxide solution whilst stirring vigorously. The resultant precipitate, to ensure complete reaction, is heated at a temperature of 80° C., for half an hour. The material is then cooled and filtered. The precipitate is dried to constant weight by heating to give 87.5 gm. of an aluminium polyoxo p-aminosalicylate-oleate.

*Example 2.—An aluminium polyoxo p-aminosalicylate-oleate (9:1 ratio)*

Aluminium isopropoxide (61.2 gm.) is dissolved in isopropyl alcohol (500 ml.) in a 5 litre flask by warming on a water bath. Oleic acid (13.8 gm.) dissolved in isopropyl alcohol (250 ml.) is added. p-Aminosalicylic acid (68.9 gm.) and water (3.6 gm.) dissolved together in isopropyl alcohol (1,500 ml.) by warming are run into the warmed aluminium reaction mixture. The resultant precipitate is warmed for half an hour and then cooled and filtered. The precipitate is dried to constant weight by heating to give 86 gm. of an aluminium polyoxo p-aminosalicylate-oleate.

*Example 3.—An aluminium polyoxo ascorbate-benzoate (1:1 ratio)*

Aluminium isopropoxide (102 gm.) was stirred under reflux with isopropanol (dry 500 ml.). Vitamin C (73.3 gm.) was stirred in hot isopropyl alcohol (750 ml.) containing water (6 gm.), and benzoic acid (50.8 gm.) was dissolved in hot isopropyl alcohol (500 ml.). The slurry and solution were added separately but simultaneously to the aluminium isopropoxide solution. The mixture was stirred and heated a further half hour at 50 to 60° C. after completion of the addition, then cooled and filtered. The residue was dried at room temperature under vacuum to constant weight giving 129 gm. of an aluminium polyoxo ascorbate-benzoate.

*Example 4.—An aluminium polyoxo trichloro-tert-butoxide stearate (9:1 ratio)*

Anhydrous trichloro-tert butyl alcohol (8 gm.) dissolved in benzene (15 ml.), and water (0.3 gm.) and stearic acid (1.4 gm. E.W. 286) dissolved together in secondary butanol (20 ml.) were added simultaneously, with stirring, to a warmed solution of aluminium sec-butoxide (7.4 gm.) in sec-butanol (25 ml.). The temperatures of the mixture was maintained at about 80 to 85° C. for one hour and stirred throughout. The liberated alcohol and solvents were then distilled off at atmospheric pressure and finally under a vacuum and throughout which the heating bath temperature did not exceed 120° C. The product was taken to constant weight giving a solid (9.8 gm.) aluminium polyoxo trichloro-tert-butoxide stearate.

*Example 5.—An aluminium polyoxo, hydroxy-acetyl-salicylate-stearate (ratio 3:3:1 and p=3)*

A solution of stearic acid (14.3 g. E.W. 286) and water (3.6 g.) in hot isopropanol (50 ml.) is added with stirring to aluminium isopropoxide (51 g.) in isopropanol (100 ml.) under reflux. The mixture is then allowed to equilibrate for half an hour whilst being maintained under reflux. Then a solution of acetylsalicylic acid (27 g.) and water (2.7 g.) in hot isopropanol (120 ml.) is added with stirring. The mixture is kept at 85° C. for one hour and stirring is maintained throughout. The product which precipitates out from the solution is filtered off and dried. The resulting aluminium polyoxo, hydroxy-acetyl salicylate-stearate weighs 55 gm.

*Example 6.—An aluminium polyoxo prednisolone-oleate (4:1 ratio)*

Prednisolone (7.2 gm.), oleic acid (1.4 g., E.W.=276), and water (0.18 g.) were dissolved together in freshly distilled dry isopropanol (100 ml.) by warming. This solution was then run into aluminium isopropoxide (3 gm.) dissolved in isopropyl alcohol (25 mm.) held under reflux. A precipitate was produced and the reaction mixture warmed for a further half an hour. Then the reaction mixture was cooled, filtered and the solid residue dried to constant weight giving an aluminium polyoxo prednisolone-oleate weighing (9 gm.).

What I claim is:

1. A method of making polymeric organic aluminium compounds, comprising reacting an aluminium alkoxide derived from an alcohol of 2–5 carbon atoms, with (*a*) water in an amount of from 0.5 mole to 1 mole per mole of aluminium alkoxide, (*b*) a substance selected from the group consisting of acetylsalicylic acid and p-amino-salicylic acid, and (*c*) a substance selected from the group consisting of oleic acid, stearic acid, benzoic acid, oleyl alcohol, stearyl alcohol, cetostearyl alcohol and castor oil, the substances (*b*) and (*c*) being present in a molar proportion between 19:1 and 0.5:1, and the amount of substances (*b*) and (*c*) being sufficient to enable at least the major part of the alkoxy groups of the alkoxide to be replaced.

2. A method as claimed in claim 1, and comprising the step of reacting with a further quantity of water to obtain a product containing hydroxyl groups.

References Cited by the Examiner

UNITED STATES PATENTS

| | | | |
|---|---|---|---|
| 2,736,725 | 2/56 | Ritter | 260—559 |
| 2,892,780 | 6/59 | Rinse | 260—414 X |
| 2,925,430 | 2/60 | Stedehouder et al. | 260—414 |
| 2,932,659 | 4/60 | Orthner et al. | 260—414 |
| 2,959,606 | 11/60 | Mitra et al. | 260—448 |
| 2,970,082 | 1/61 | Mirale | 260—448 X |

FOREIGN PATENTS 569,946  2/33  Germany.

CHARLES B. PARKER, *Primary Examiner.*

T. E. LEVOW, D. D. HORWITZ, *Examiners.*